United States Patent [19]

Cheng

[11] Patent Number: 4,935,653
[45] Date of Patent: Jun. 19, 1990

[54] STATOR FOR A CEILING FAN

[76] Inventor: Peter Cheng, No. 20, Weng Hsi Rd., Weng Ming Li, Feng Yuan City, Taichung Hsien, Taiwan

[21] Appl. No.: 351,065

[22] Filed: May 12, 1989

[51] Int. Cl.5 .......................... H02K 11/00; H02K 1/12
[52] U.S. Cl. .................................... 310/72; 310/68 R; 310/254; 310/DIG. 6
[58] Field of Search ................ 310/67 R, 68 R, 68 A, 310/72, 157, 184, 185, 187, 254, DIG. 6; 388/827, 838, 840

[56] References Cited

U.S. PATENT DOCUMENTS

| 3,566,165 | 5/1969 | Lohr | 310/67 R |
| 4,179,644 | 12/1979 | Vassos | 310/50 |
| 4,296,363 | 10/1981 | Blake et al. | 388/840 |
| 4,408,244 | 10/1983 | Weible | 388/84 D |
| 4,823,034 | 4/1989 | Wrobel | 310/254 |

FOREIGN PATENT DOCUMENTS 0085028 4/1986 Japan ................................ 310/254

Primary Examiner—Peter S. Wong
Assistant Examiner—C. E. LaBalle
Attorney, Agent, or Firm—Morton J. Rosenberg; David I. Klein

[57] ABSTRACT

A stator for a ceiling fan includes a disc with two different depth slots alternately formed on the outer peripheral edge. A primary winding and a secondary winding are respectively wound in the longer slots and the shorter slots. An axle is disposed through the center of the disc and a circuit board including one or more resistors is disposed on a surface of the disc. Two or more contacts are provided for connection to a switch for changing the power supplied to the windings through the contacts in order to change the rotational speed of the ceiling fan. A cavity is formed on the circuit board for receiving the resistors.

1 Claim, 6 Drawing Sheets

STATOR FOR A CEILING FAN

FIELD OF THE INVENTION

The present invention relates to a stator, and more particularly to a stator for a ceiling fan, which employs a resistive circuit board for controlling the speed of the ceiling fan.

BACKGROUND OF THE INVENTION

Normally, a circuit of a ceiling fan has a primary winding 11 and a secondary winding 12 electrically connected in parallel. From FIG. 5 it can be seen that a number of contacts a, b and c are electrically connected to the windings 11 and 12 for determining several rotating speeds of the ceiling fan. As shown in FIG. 6, the primary winding 11 is wound in the inner slots of a stator and terminates in the two terminals A and B. The secondary winding 12 is wound in the outer slots and consists of three sections each terminating in two terminals C to H. The terminals A and C, D and E, F and G respectively form the contacts c, b and a. Terminal H connects to terminal B after connecting with a capacitor. It is difficult and time consuming to bring the wires of those terminals A to H out from the stator during manufacturing. The secondary winding 12 is separated into three sections with intermediate contacts at a and b. In such construction, using either contact a or b produces an unbalanced electromagnetic field and creats excesive noise. People are annoyed by such noise especially during the night.

Another similar prior art is shown in FIG. 7 and 8. Windings 13 and 14 are further wound over the primary winding 11 thus forming the contacts a, b, c etc. Electrically connecting of a selective switch 3 to the respective contacts a, b or c select three different electromagnetic field intensities ranging from strong to weak, thereby constituting three different rotating speeds of the ceiling fan. These windings are more homogeneous than the previous windings, but their electromagnetic fields still interfere with each other and they are difficult and time consuming to wind on the stator.

The present invention has arisen to mitigate and/or obviate the afore-described disadvantages of the stator of a ceiling fan.

SUMMARY OF THE INVENTION

The primary object of the present invention is to provide a stator with a resistive circuit for a ceiling fan, which does not creat unbalanced electromagnetic fields.

Another object of the present invention is to provide a stator for a ceiling fan with a circuit board for mounting of the resistive circuit which simplifies the structure and assembly of the stator and thereby reduces the cost.

Therefore, the present invention seeks to provide a stator including a primary winding, a secondary winding and a resistive circuit disposed on a circuit board mounted on the stator of a ceiling fan. The circuit consists of one or more resistors disposed on the circuit board either in series or in parallel terminating at several contacts either between every two adjacent resistors (in series), or at one end of each of the resistors (in parallel). Such that a selective switch electrically connects the respective contacts for changing the current flowing through the windings thus producing various electromagnetic fields therein and causing various speeds of the ceiling fan.

Further objects and advantages of the present invention will become apparent from a careful reading of the detailed description provided hereinbelow, with appropriate reference to the accompanying drawings.

DETAILED DESCRIPTION OF THE INVENTION

Figure 1:
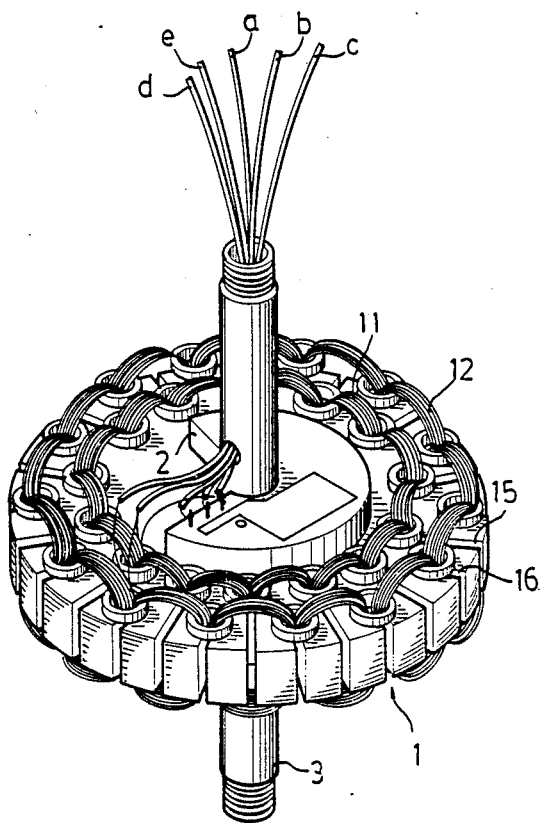
FIG. 1 is a perspective view of a stator in accordance with the present invention.
Figure 2:
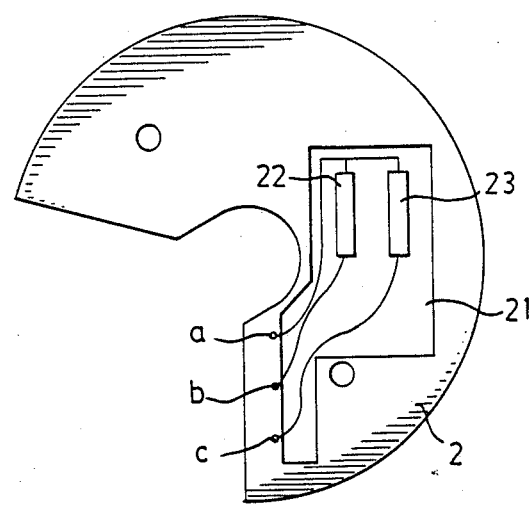
FIG. 2 is a top view of a circuit board in accordance with the present invention (component side)

Referring to FIGS. 1 and 2, the stator 1 in accordance with the present invention is generally a disc with two different depth slots 15, 16 alternately formed on the outer peripheral edge of the stator 1. A primary winding 11 and a secondary winding 12 are wound in the longer slots 15 and the shorter slots 16 respectively. An axle 3 is vertically provided through the center of the disc 1. A circuit board 2 is disposed on the disc 1 around the axle 3. A cavity 21 is formed on the circuit board 2 for receiving the electrical components, such as resistors 22, 23 etc. For sake of heat dissipation, the circuit board 2 is preferably made of ceramic.

Figure 3:
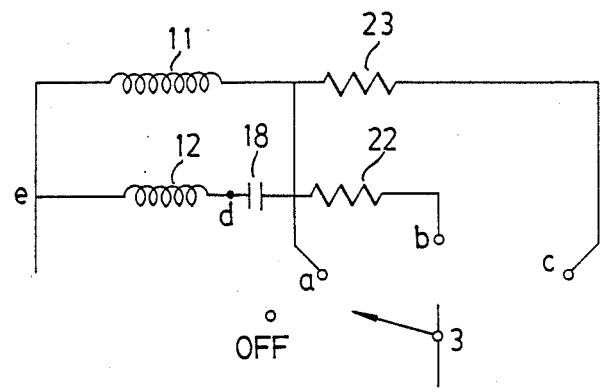
FIG. 3 is an electrical schematic diagram of a ceiling fan employing a circuit in accordance with the present invention.
Figure 4:
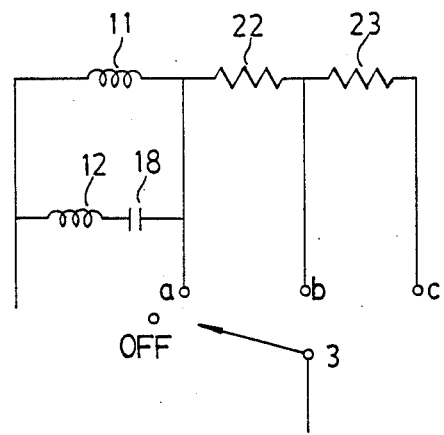
FIG. 4 is another electrical schematic diagram similar to FIG. 3.
Figure 5:
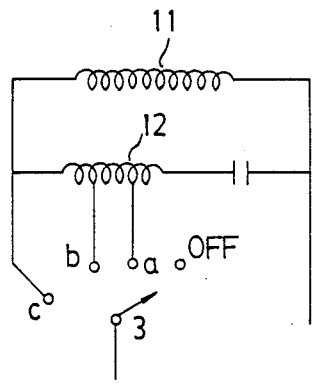
FIG. 5 is an electrical schematic diagram of a prior art.
Figure 7:
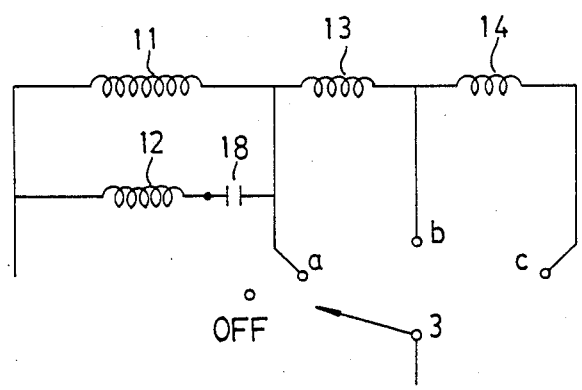
FIG. 7 is another electrical schematic diagram of another prior art.
Figure 6:
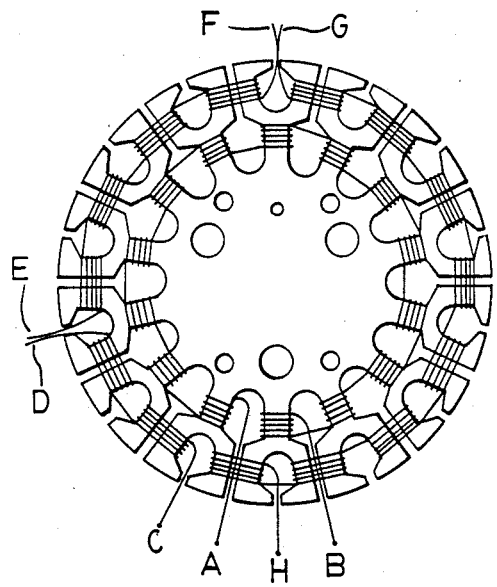
FIG. 6 is a cross-sectional view of a stator in accordance with the prior art, showing the windings and contacts of the stator.
Figure 8:
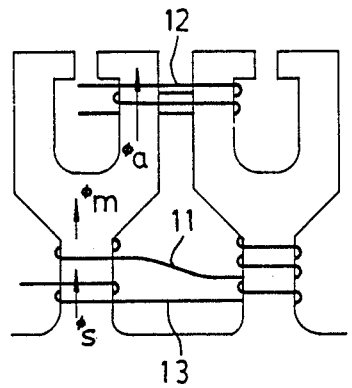
FIG. 8 is a partial enlarged view of the windings of FIG. 6.

Referring to FIG. 3, the primary winding 11 and the secondary winding 12 are connected in parallel, and/or a capacitor 18 is connected to the secondary winding 12 in series. Two resistors 22, 23 with different resistances are connected to the windings 11, 12 respectively. Contacts a, b and c are formed on the common end of the windings 11, 12 and resistors 22 and 23, the other end of the resister 22 and the other end of the resistor 23. Preferably, the resistance of the resistor 22 is smaller than that of the resistor 23. A switch 3 can select between the contacts a, b, c, and "off" position. Obviously, when the switch 3 respectively connects to contacts a, b or c, the voltage as well as the current from a power source (not shown) to the windings 11, 12 are increased from a to c, i.e. when the switch 3 connects to the contact a, the current flowing through the windings 11, 12 is large, and when connects to the contact b, it is smaller, and to c, it is the smallest. Accordingly, the electromagnetic fields produced by the windings 11, 12 under the afore-described conditions change from large to small and the speeds of the ceiling fan also change from fast to slow. Referring to FIG. 4, the circuit is identical to FIG. 3 except that the resistors 22, 23 are connected in series.

Figure 9:
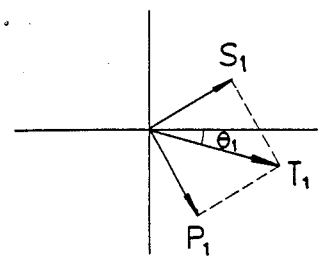
FIGS. 9 to 11 are diagrams showing vectors of various magnetic flux.
Figure 10:
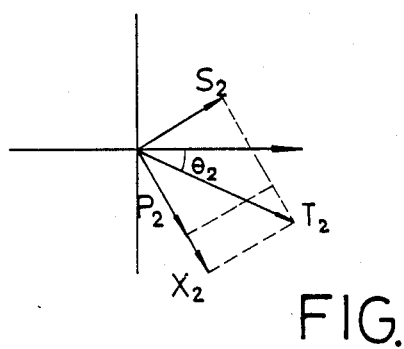

Now, referring to FIGS. 9 to 11 and FIGS. 7, 3 and 4, when the switch 3 is connected to the contact a, the magnetic flux generated by the primary winding 11 and the secondary winding 12 are P1 and S1 respectively, generally perpendicular with each other, thereby forming a combination magnetic flux T1 at an angle $\theta$1 to the horizontal axis (FIG. 9). Generally, this is a stable condition. But, when connected to contact b, the current flowing through the windings 11, 12 is reduced because of the auxiliary winding 13. Therefore, the flux generated by the primary winding 11 and the secondary winding 12 are decreased to P2 and S2 respectively (FIG. 10.). The auxiliary winding 13 also generates a magnetic flux X2 in the direction parallel with the primary magnetic flux P2. Therefore, a combination magnetic flux T2 is formed by the magnetic flux P2, S2 and X2. The angle $\theta$2 between the combination magnetic flux T2 and the horizontal axis is larger than $\theta$1. Subsequently, an unstable electromagnetic field is generated in the stator, thus making increase noise.

Figure 11:
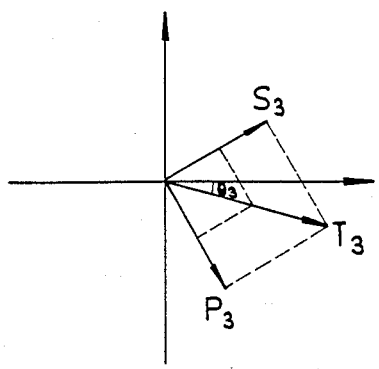

Referring next to FIGS. 3, 4 and 11, when the switch 3 is connected to the contact a, the electromagnetic flux generated by the primary winding 11 and the secondary winding 12 are P3 and S3 respectively. The angle $\theta$3 between the combination electromagnetic flux T3 and the horizontal axis is equal to $\theta$1 of FIG. 9, which is a stable condition. When connected to the contact b, the directions of the magnetic flux P3, S3 and the angle $\theta$3 are unchanged. The only change is the magnitude of the electromagnetic FIUX P3 and S3. The electromagnetic field of the stator remains stable.

Accordingly, the present invention has the following advantages:

(a) The change in the power supplied to the windings 11, 12 is made by the resistors 22, 23, which do not affect the electromagnetic field. Therefore, no noise is created due to unbalanced electromagnetic fields.

(b) It is simple and more easy to install and assemble circuit board than to wind additional windings 13, 14 in the stator. This reduces the manufacturing time and cost.

(c) It is easy to add more speeds to the ceiling fan by simply adding resistors and contacts.

Although this invention has been described with a certain degree of particularity, it is understood that the present disclosure has been made by way of example only and that numerous changes in the detailed construction and the combination and arrangement of parts may be resorted to without departing from the spirit and scope of the invention as hereinafter claimed.

I claim:

1. A stator for a ceiling fan comprising a disc with a long slot and a short slot alternately formed on an outer peripheral edge thereof, said long slot and said short slot having different depth; a primary winding and a secondary winding being respectively wound in said long slot and said short slot; an axle being disposed through a center of said disc; a circuit board preferably formed of a ceramic composition has at least one resistor mounted thereon being disposed on a surface of said disc; at least two contacts being on a surface of said disc; at least two contacts being formed on said circuit board; a switch selectively connecting said contacts; said contacts being electrically connected to either said resistor or said windings; and a cavity being formed on said circuit board for receiving said resistor.

* * * * *